US012401145B2

(12) United States Patent
Hashimoto et al.

(10) Patent No.: US 12,401,145 B2
(45) Date of Patent: Aug. 26, 2025

(54) IC SOCKET WITH HIGH SPEED CONTACTS

(71) Applicants: Tyco Electronics Japan G.K., Kawasaki (JP); TE Connectivity Solutions GmbH, Schaffhausen (CH)

(72) Inventors: Shinichi Hashimoto, Kawasaki (JP); Hiroshi Shirai, Kawasaki (JP); Naoki Hashimoto, Kawasaki (JP); Masayuki Aizawa, Kawasaki (JP); Hirotate Kadobayashi, Kawasaki (JP); Chad William Morgan, Carneys Point, NJ (US)

(73) Assignees: TE Connectivity Solutions GmbH, Schaffhausen (CH); TE Connectivity Japan G.K., Kawasaki (JP)

( * ) Notice: Subject to any disclaimer, the term of this patent is extended or adjusted under 35 U.S.C. 154(b) by 392 days.

(21) Appl. No.: 18/067,100

(22) Filed: Dec. 16, 2022

(65) Prior Publication Data

US 2024/0204432 A1 Jun. 20, 2024

(51) Int. Cl.
*H01R 12/71* (2011.01)
*H01R 13/24* (2006.01)
*H01R 13/629* (2006.01)

(52) U.S. Cl.
CPC ......... *H01R 12/714* (2013.01); *H01R 12/716* (2013.01); *H01R 13/2407* (2013.01); *H01R 13/2435* (2013.01); *H01R 13/629* (2013.01)

(58) Field of Classification Search
CPC ............... H01R 12/714; H01R 12/716; H01R 13/2407; H01R 13/2435; H01R 13/629; H01R 13/2457; H01R 12/7076; H01R 13/245; H01R 12/70; H01R 13/646
USPC ............................................................ 439/66
See application file for complete search history.

(56) References Cited

U.S. PATENT DOCUMENTS

| | | | | |
|---|---|---|---|---|
| 7,150,632 B2 * | 12/2006 | Lee | H01R 12/7076 | 439/66 |
| 2004/0235316 A1 * | 11/2004 | Liao | H01R 13/2435 | 439/66 |
| 2004/0259393 A1 * | 12/2004 | Chiang | H01R 13/2435 | 439/66 |
| 2007/0218764 A1 * | 9/2007 | Chang | H01R 12/52 | 439/607.01 |
| 2011/0111607 A1 * | 5/2011 | Chang | H01R 12/7076 | 439/70 |
| 2017/0365947 A1 * | 12/2017 | Costello | H01R 13/2442 | |

* cited by examiner

*Primary Examiner* — Tulsidas C Patel
*Assistant Examiner* — Jeffrey Mountain

(57) ABSTRACT

An electrical connector having a housing with a first surface and a second surface. Contact receiving openings extend from the first surface to the second surface. Contacts are positioned in the contact receiving openings. The contacts have base members and resilient contact beams extending from opposed sides of the base members. Sidewalls extend from opposed sides of the base members from which the resilient contact beams do not extend. The contacts also provide multiple electrical pathways across the contacts for electrical signal transmissions, allowing for signal transmissions to be transmitted at frequencies of approximately 224 Gbps or greater.

17 Claims, 6 Drawing Sheets

IC SOCKET WITH HIGH SPEED CONTACTS

FIELD OF THE INVENTION

The present invention relates to contact and an electrical connector for electrically connecting an integrated circuit (IC) to a circuit board. In particular, the invention is directed to a contact which allows for high speed signal transmission while providing sufficient normal force to establish a proper electrical connection.

BACKGROUND OF THE INVENTION

Integrated circuits have a number of contact pads which are electrically connected to a circuit board through a connector. Contacts of a number equal to the number of the pads are correspondingly arrayed on an IC socket. Such contacts and sockets are known in the industry.

Recently, ICs have begun processing high-speed signals such as a signal at 100 GHz or above. The current IC sockets and contacts generally cannot accommodate such signal speeds.

Consequently, there is a need for IC sockets which have contacts that can transmit such high-speed signals while also providing the normal forces required to make a proper electrical connection.

SUMMARY OF THE INVENTION

An embodiment is directed to an electrical connector having a housing with a first surface and a second surface. Contact receiving openings extend from the first surface to the second surface. Contacts are positioned in the contact receiving openings. The contacts have base members and resilient contact beams extending from opposed sides of the base members. Sidewalls extend from opposed sides of the base members from which the resilient contact beams do not extend.

The connector and contacts is configured to provide sufficient normal force to ensure that a positive electrical and mechanical connection is made between the contacts and mating components, such as integrated circuits and circuit boards. The contacts also provide multiple electrical pathways across the contacts for electrical signal transmissions, allowing for signal transmissions to transmitted at frequencies of approximately 224 Gbps or greater.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
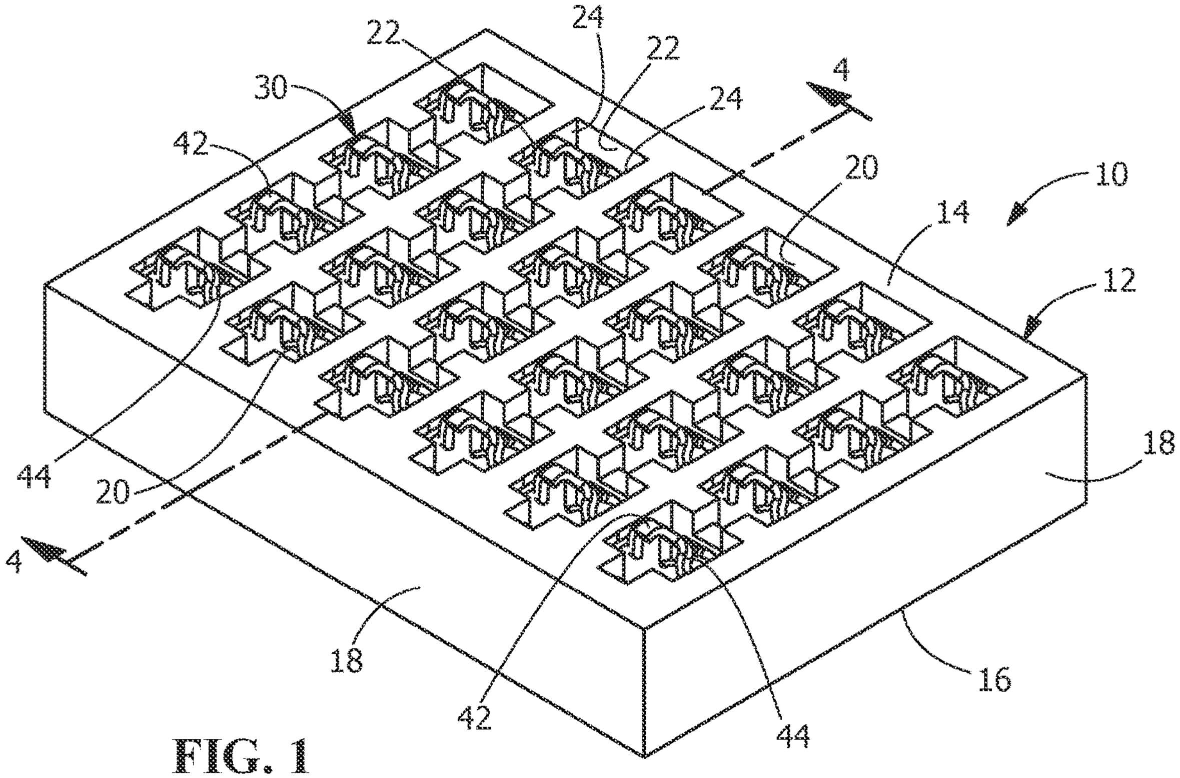
FIG. 1 is a perspective view of an illustrative electrical connector assembly with contacts according to the present invention for electrically connecting an integrated circuit to a circuit board.
Figure 2:
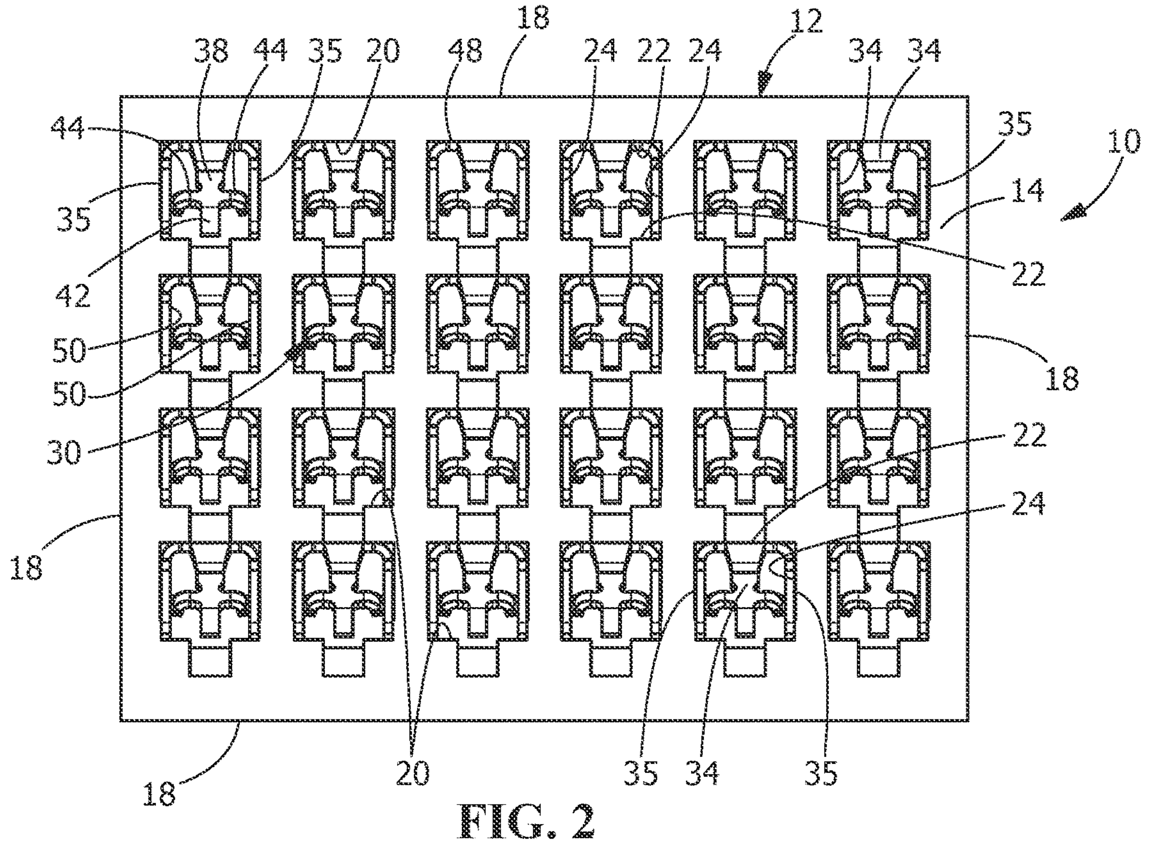
FIG. 2 is a top view of the electrical connector of FIG. 1.
Figure 3:
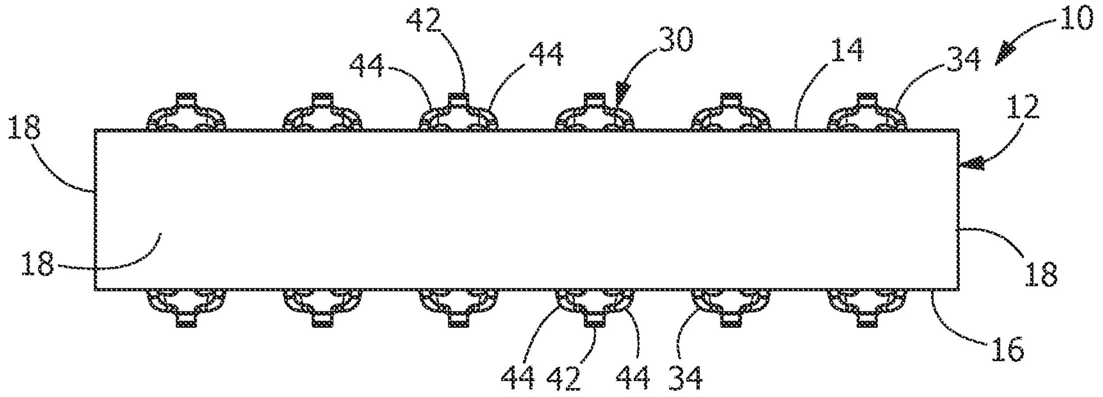
FIG. 3 is a side view of the electrical connector of FIG. 1.
Figure 4:
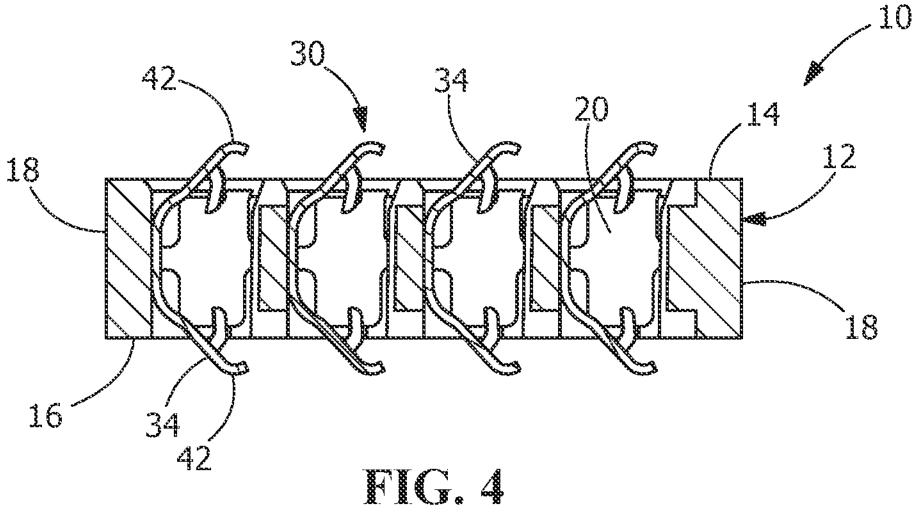
FIG. 4 is a cross sectional view taken along line 4-4 of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom” as well as derivative thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIGS. 1-4, a first illustrative electrical connector assembly 10 has a housing 12 with a top or first surface 14 and an oppositely facing bottom or second surface 16. Sidewalls 18 extend between the top surface 14 and the bottom surface 16. In the illustrative embodiment shown, the housing has a generally rectangular shape, but other configurations of the housing may be used. The housing 12 is made from a nonconductive material which has the mechanical strength required.

Contact receiving openings 20 are provided in the housing 12. The contact receiving openings 20 extend from the top surface 14 to the bottom surface 16. The number of the contact receiving openings 20 may vary depending on the number of electrical connections required between an integrated circuit 17 (FIG. 5) positioned on the top surface 14 and a circuit board 19 (FIG. 5) positioned on the bottom surface 16. The contact receiving openings 20 have first sidewalls 22 and second sidewalls 24. Each contact receiving opening 20 has two opposed first sidewalls 22 and two opposed second sidewalls 24.

Contacts 30 are positioned in each of the contact receiving openings 20. Each of the contacts 30 is formed by stamping and forming a conductive material, such as, but not limited to, a metal plate.

Figure 5:
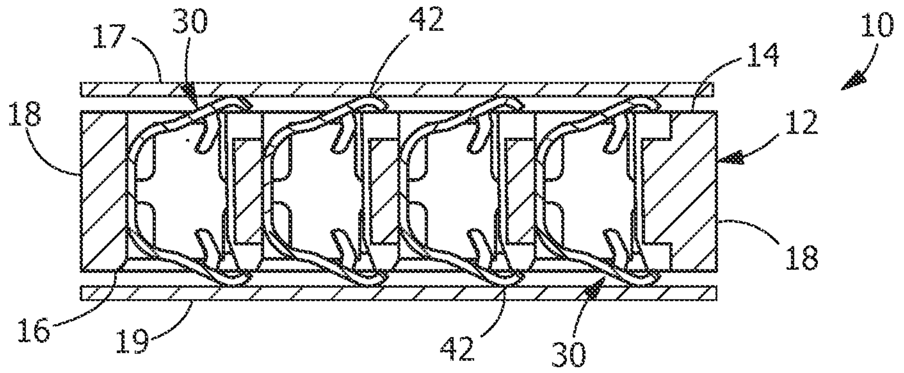
FIG. 5 is a cross sectional view similar to FIG. 4 with the illustrative connector mounted between an integrated circuit and circuit board.
Figure 6:
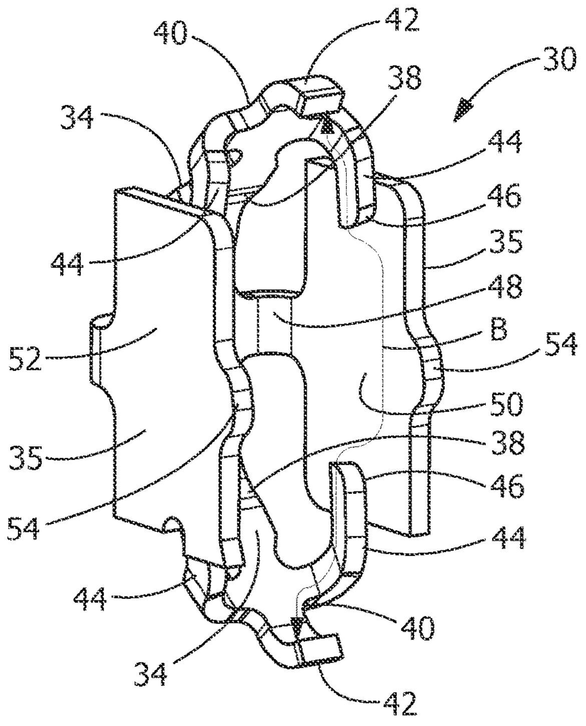
FIG. 6 is a perspective view of an illustrative contact of the connector of FIG. 1.
Figure 7:
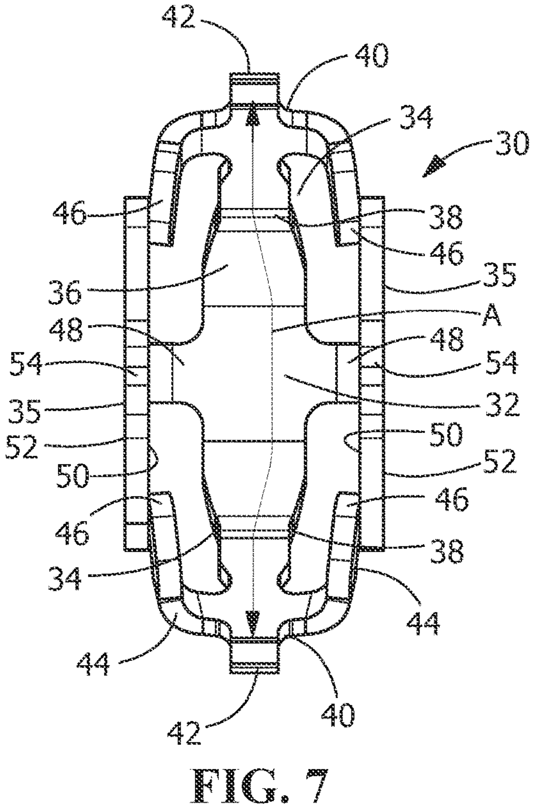
FIG. 7 is a side view of the contact of FIG. 6.

As shown in FIGS. 5-7, the contacts 30 have base members 32. Resilient contact beams 34 extend from opposed sides of the base members 32. Sidewalls 35 extend from opposed sides of the base members 32 from which the resilient contact beams 34 do not extend.

In the illustrative embodiment shown, each contact 30 has two primary resilient contact beams 34 which are essentially mirror images of each other. The primary resilient contact beams 34 are bent from the base members 32 and extend obliquely therefrom. The primary resilient contact beams 34 have fixed end portions 36, arcuate or curved portions 38 and contact portions 40. The fixed end portions 36 extend from and are integrally attached to the base members 32. The arcuate or curved portions 38 extend from the fixed end portions 36 to the contact portions 40. The contact portions 40 extend from the arcuate or curved portions 38 and are provided at the free ends of the primary resilient contact beams 34.

The contact portions 40 have contact areas 42 and secondary resilient beams 44. In the embodiment shown, the contact areas 42 have a curved, convex shape and are positioned proximate the free ends of the primary resilient contact beams 34. The contact areas 42 are provided in line with the longitudinal axes of the primary resilient contact beams 34. The secondary resilient beams 44 extend from either side of the primary resilient contact beams 34. The secondary resilient beams 44 are bent such that free ends 46 of the secondary resilient beams 44 extend outside the plane of the contact areas 42. The contact area 42 and the secondary resilient beams 44 of each contact 30 form a U-shaped member as viewed in FIG. 7.

The sidewalls 35 are planar members connected to the base members 32 by linking members 48 which extend between the sidewalls 35 and the base members 32. Each contact 30 has two linking members 48 which extend from opposite sides of the base member 32. The linking members 48 extend from the sides of the base member 32 from which no primary resilient contact beam 34 extends. The linking members 48 are bent such that the planes of the sidewalls 35 extend in a direction which is essentially perpendicular to the planes of the base members 32.

The sidewalls 35 have inside surfaces 50 and outside surfaces 52. Retention projections 54 extend from the sidewalls 35. In the illustrative embodiment shown, the retention projections 54 are rounded and project from a side surfaces of the sidewalls 35. However, other configurations of the retention projections 54 may be used.

Figure 8:
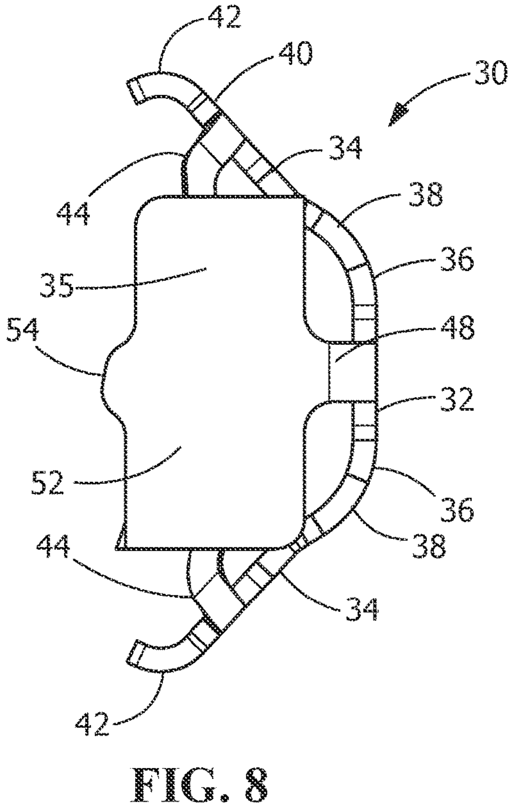
FIG. 8 is a side view of the contact of FIG. 6.

As shown in FIGS. 6 through 8, when each contact 30 is formed, the free ends 46 of the secondary resilient beams 44 are provided in mechanical and electrical engagement with inside surfaces 50 of the sidewalls 35. The free ends 46 are configured to move relative to the inside surfaces 50 as force is applied to the contact areas 42 of the contacts 30, as will be more fully described.

As shown in FIGS. 1 through 5, the contacts 30 are positioned in the contact receiving openings 20 of the housing 12 of the electrical connector assembly 10. In this position, the base members 32 of the contacts 30 are positioned proximate to or in engagement with respective first sidewalls 22 of the contact receiving openings 20. In addition, the sidewalls 35 of the contacts 30 are positioned proximate to or in engagement with the second sidewalls 24 of the contact receiving openings 20. The retention projections 54 of the sidewalls 35 of the contacts 30 engage respective first sidewalls 22 of the contact receiving openings 20. The interaction and the engagement of the base members 32, the sidewalls 35 and the retention projections 54 of the contacts 30 with the first sidewalls 22 and the second sidewalls 24 of the contact receiving openings 20 provides an interference fit or press fit between the contacts 30 and the contact receiving openings 20 to mechanically secure the contacts 30 in the contact receiving openings 20.

As shown in FIGS. 6 through 8, when each contact 30 is formed, the free ends 46 of the secondary resilient beams 44 are provided in mechanical and electrical engagement with inside surfaces 50 of the sidewalls 35. The free ends 46 are configured to move relative to the inside surfaces 50 as force is applied to the contact areas 42 of the contacts 30, as will be more fully described.

With contacts 30 properly secured in the contact receiving openings 20, the contact portions 40 of respective primary resilient contact beams 34 extends or protrudes beyond the top surface 14 of the housing 12 so that conductive pads (not shown in the figures) of the integrated circuit 17 electrically and mechanically contacts the contact portions 40. Similarly, the contact portions 40 of other respective primary resilient contact beams 34 extends or protrudes beyond the bottom surface 16 of the housing 12 so that conductive pads (not shown in the figures) of the circuit board 19 electrically and mechanically contacts the contact portions 40.

In operation, the electrical connector assembly 10 is moved into position relative the circuit board 19, such that respective bottom contact portions 40 of the contacts 30 are provided in line with the pads of the circuit board 19. The housing 12 of the connector assembly 10 is moved into engagement with the pads of the circuit board 19. As this occurs, force is applied to the bottom contact portions 40 which extend from the bottom surface 16 of the housing 12. This causes the bottom contact portions 40 to move in a direction toward the top surface 14 of the housing 12. As this occurs, the respective bottom primary resilient contact beams 34 are elastically deformed. In addition, as the bottom contact portions 40 are moved, the free ends 46 of the bottom secondary resilient beams 44 are frictionally slide across the inside surfaces 50 of the sidewalls 35. The elastic deformation of the bottom primary resilient contact beams 34 and the frictional engagement of the free ends 46 of the bottom secondary resilient beams 44 with the inside surfaces 50 of the sidewalls 35 as the free ends 46 are moved cause the bottom contact portions 40 to exert a normal force on the pads of the circuit board 19. This allows the bottom contact portions 40 to be retained in mechanical and electrical engagement with the contact pads of the circuit board 19. The movement of the bottom contact portions 40 is greater than approximately 0.05 mm, approximately 0.1 mm, less than approximately 0.5 mm. The normal force exerted by the bottom contact portions 40 is greater than approximately 15 grams, greater than approximately 20 grams, between approximately 15 grams and 30 grams, between approximately 20 grams and 25 grams. The connector assembly 10 is secured to the circuit board 19 using known methods.

An integrated circuit 17 is moved into position relative to the electrical connector assembly 10, such that respective top contact portions 40 of the contacts 30 are provided in line with the pads of the integrated circuit 17. The integrated circuit 17 is moved into engagement with housing 12 of the connector assembly 10. As this occurs, force is applied to the top contact portions 40 which extend from the top surface 14 of the housing 12. This causes the top contact portions 40 to move in a direction toward the bottom surface 16 of the housing 12. As this occurs, the respective top primary resilient contact beams 34 are elastically deformed. In addition, as the top contact portions 40 are moved, the free ends 46 of the top secondary resilient beams 44 are frictionally slide across the inside surfaces 50 of the sidewalls 35. The elastic deformation of the top primary resilient contact beams 34 and the frictional engagement of the free ends 46 of the top secondary resilient beams 44 with the inside surfaces 50 of the sidewalls 35 as the free ends 46 are moved cause the top contact portions 40 to exert a normal force on the pads of the integrated circuit 17. This allows the top contact portions 40 to be retained in mechanical and electrical engagement with the contact pads of the integrated circuit 17. The movement of the bottom contact portions 40 is greater than approximately 0.05 mm, approximately 0.1 mm, less than approximately 0.5 mm. The normal force exerted by the top contact portions 40 is greater than approximately 15 grams, greater than approximately 20 grams, between approximately 15 grams and 30 grams, between approximately 20 grams and 25 grams. The integrated circuit 17 is secured to the connector assembly 10 using known methods.

With the connector assembly 10 properly connected to the integrated circuit 17 and the circuit board 19, each contact 30 provides multiple electrical pathways for electrical signal transmissions. The first electrical pathway, as shown by arrow A in FIG. 7, is between the integrated circuit pad, the top contact area 42 of the top contact portion 40, the top arcuate or curved portion 38, the top fixed end portion 36, the base member 32, the bottom fixed end portion 36, the bottom arcuate or curved portion 38, the bottom contact area 42 of the bottom contact portion 40 and the circuit board pad. The second electrical pathway, as shown by arrow B in FIG. 6, is between the integrated circuit pad, the top contact area 42 of the top contact portion 40, the two top secondary resilient beams 44, the sidewalls 35, the two bottom secondary resilient beams 44, the bottom contact area 42 of the bottom contact portion 40 and the circuit board pad. The allows the signal transmissions to transmitted at frequencies of approximately 224 Gbps or greater.

Figure 9:
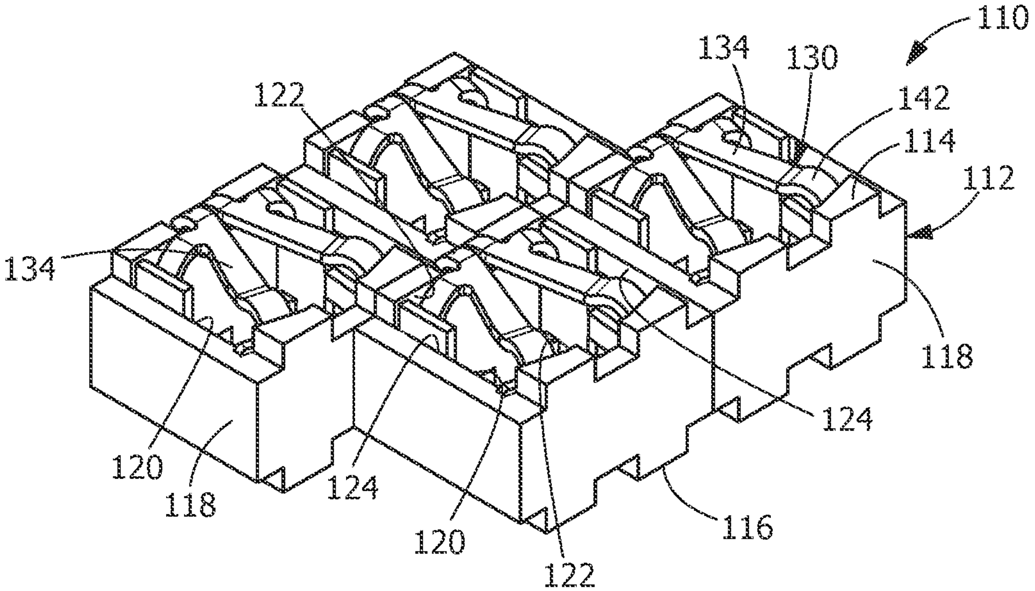
FIG. 9 is a perspective view of another illustrative electrical connector with contacts according to the present invention for electrically connecting an integrated circuit to a circuit board, the contacts are shown in the closed or stressed position.
Figure 10:
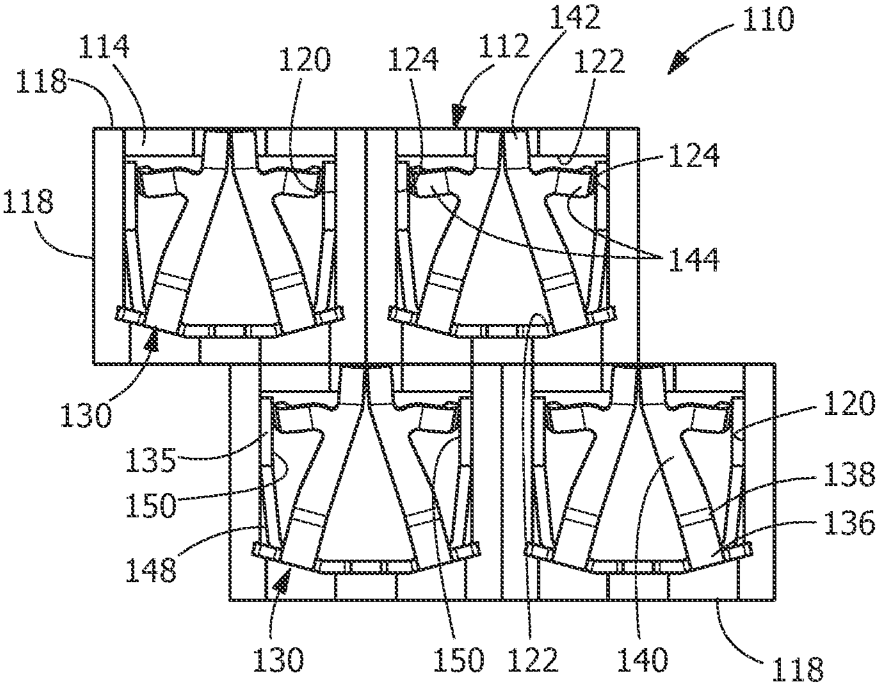
FIG. 10 is a top view of the electrical connector of FIG. 9.
Figure 11:
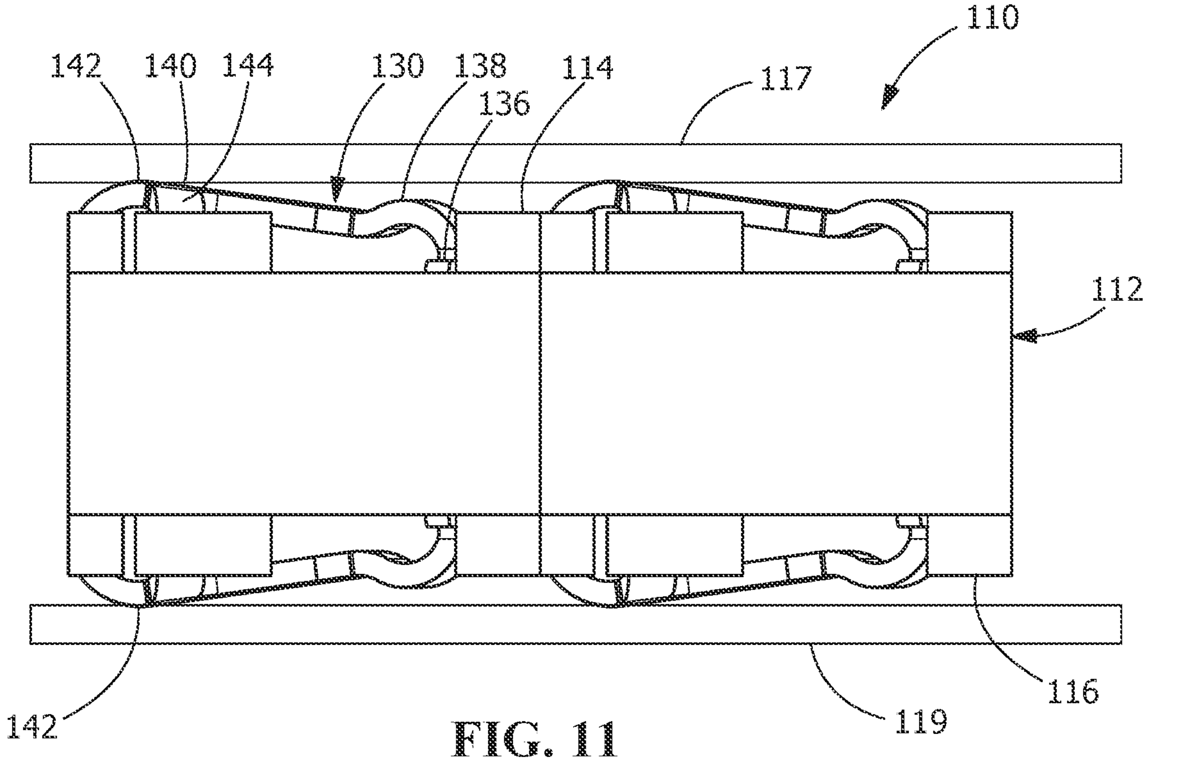
FIG. 11 is a side view of a representative closed contact of the electrical connector of FIG. 9.

As shown in FIGS. 9-11, a second illustrative electrical connector assembly 110 has a housing 112 with a top surface 114 and an oppositely facing bottom surface 116. Sidewalls 118 extend between the top surface 114 and the bottom surface 116. In the illustrative embodiment shown, a partial view of the housing 112. The housing may have a generally rectangular shape, but other configurations of the housing may be used. The housing 112 is made from a nonconductive material which has the mechanical strength required.

Contact receiving openings 120 are provided in the housing 112. The contact receiving openings 120 extend from the top surface 114 to the bottom surface 116. The number of the contact receiving openings 120 may vary depending on the number of electrical connections required between an integrated circuit 117 (FIG. 11) positioned on the top surface 114 and a circuit board 19 (FIG. 11) positioned on the bottom surface 116. The contact receiving openings 120 have first sidewalls 122 and second sidewalls 124. Each contact receiving opening 120 has two opposed first sidewalls 122 and two opposed second sidewalls 124. Respective sidewalls 122 many be contoured to accommodate the shape of the contacts 130.

Contacts 130 are positioned in each of the contact receiving openings 120. Each of the contacts 130 is formed by stamping and forming a conductive material, such as, but not limited to, a metal plate.

Figure 13:
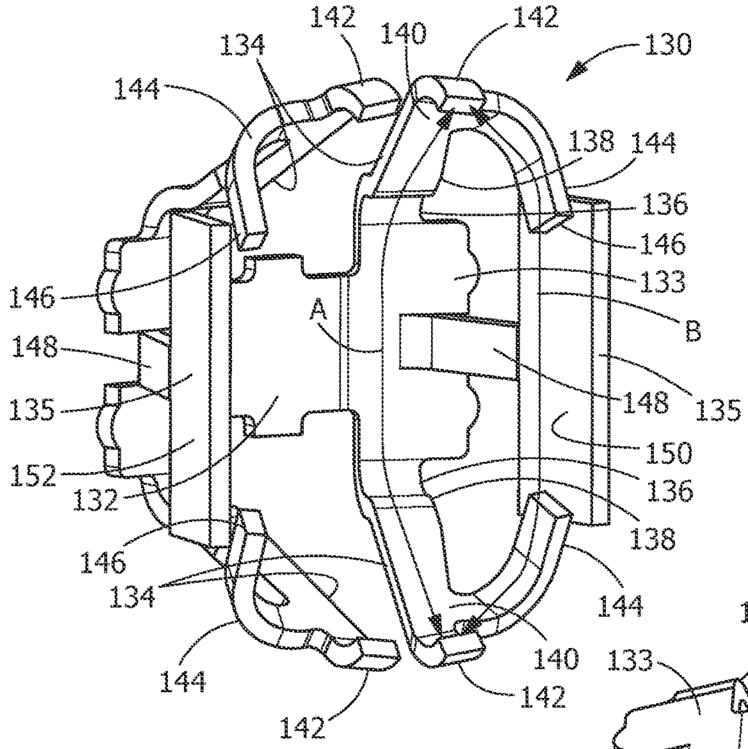
FIG. 13 is a top perspective view of an illustrative contact of the connector of FIG. 9.
Figure 14:
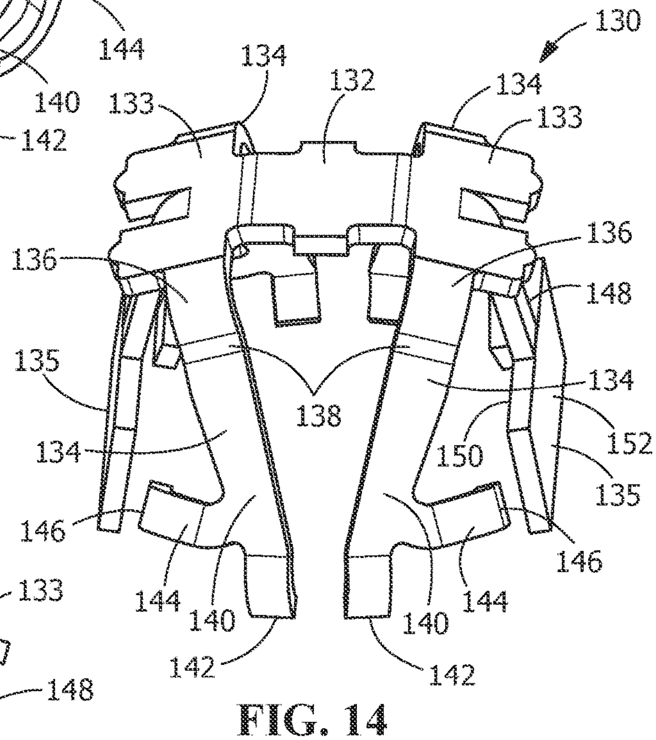
FIG. 14 is a bottom perspective view of an illustrative contact of the connector of FIG. 13.
Figure 15:
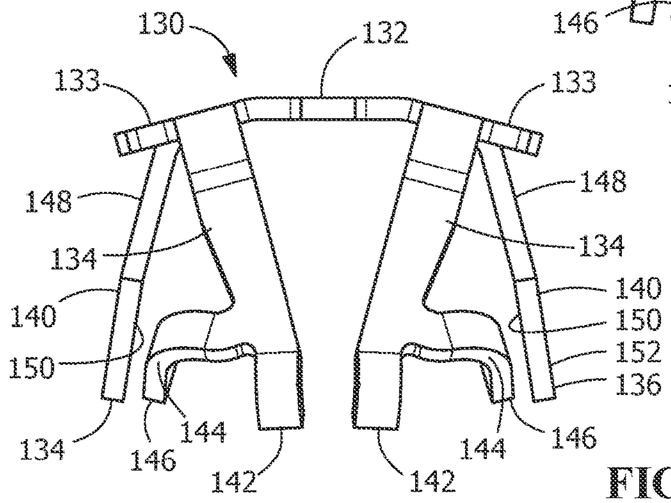
FIG. 15 is a top view of the contact of FIG. 13.

As shown in FIGS. 13-15, the contacts 130 have base members 132. The base members 132 have angled sections 133 which extend from each side of the base members 132. Resilient contact beams 134 extend from opposed sides of the angled sections 133 of the base members 32. In the embodiment shown, each contact 130 has four resilient contact beams 134. Sidewalls 135 extend from the ends of the angled section 133 of the base members 132.

In the illustrative embodiment shown, each contact 30 has four primary resilient contact beams 134, with two extending from each angled section 133. The two which extend from same angled section 133 are essentially mirror images of each other. The primary resilient contact beams 134 are bent from the angled sections 133 of the base members 132 and extend obliquely therefrom. The primary resilient contact beams 134 have fixed end portions 136, arcuate or curved portions 138 and contact portions 140. The fixed end portions 136 extend from and are integrally attached to the angled sections 133 of the base members 132. The arcuate or curved portions 138 extend from the fixed end portions 136 to the contact portions 140. The contact portions 140 extend from the arcuate or curved portions 138 and are provided at the free ends of the primary resilient contact beams 134.

The contact portions 140 have contact areas 142 and secondary resilient beams 144. In the embodiment shown, the contact areas 142 have a curved, convex shape and are positioned proximate the free ends of the primary resilient contact beams 134. The contact areas 142 are provided in line with the longitudinal axes of the primary resilient contact beams 134. The secondary resilient beams 144 extend from one side of the primary resilient contact beams 134. The side from which the secondary resilient beams 144 extend varies depending upon the positioning of the primary resilient contact beams 134. The secondary resilient beams 144 are bent such that free ends 146 of the secondary resilient beams 144 extend outside the plane of the contact areas 142. The contact area 142 and the secondary resilient beam 144 of each primary resilient contact beams 134 of a halve of a U-shaped member, while two adjacent contact areas 142 and secondary resilient beams 144 form a generally U-shaped member as viewed in FIG. 13.

The sidewalls 135 are planar members connected to the angled sections 133 of the base members 132 by linking members 148 which extend between the sidewalls 135 and the angled sections 133 of the base members 132. Each contact 130 has two linking members 148 which extend from opposite sides of the base member 132. The linking members 148 extend from the ends of the angled sections 133 of the base member 32 from which no primary resilient contact beam 134 extends. The linking members 148 are bent such that the planes of the sidewalls 135 extend in a direction which approached, but is less than, perpendicular to the planes of the base members 132. The sidewalls 135 have inside surfaces 150 and outside surfaces 152. As shown in FIGS. 13 through 15, when each contact 130 is formed, the free ends 146 of the secondary resilient beams 144 are spaced from the inside surfaces 150 of the sidewalls 135.

As shown in FIGS. 9 through 12, the contacts 130 are positioned in the contact receiving openings 120 of the housing 112 of the electrical connector assembly 110. In this position, the base members 132, including the angled sections 133 of the contacts 130 are positioned proximate to or in engagement with respective first sidewalls 122 of the contact receiving openings 120. In addition, the sidewalls 135 of the contacts 130 are positioned proximate to or in engagement with the second sidewalls 124 of the contact receiving openings 120. The positioning of the sidewalls 135 in engagement with the second sidewalls 124 of the contact receiving openings 120 causes the linking member 148 to be elastically deformed and the sidewalls 135 of each contact 130 to be moved toward each other.

The interaction and the engagement of the base members 132 and the sidewalls 135 with the first sidewalls 122 and the second sidewalls 124 of the contact receiving openings 120 provides an interference fit or press fit between the contacts 130 and the contact receiving openings 120 to mechanically secure the contacts 130 in the contact receiving openings 120.

As shown in FIGS. 9 and 10, when each contact 130 is properly positioned in the contact receiving openings 120, the free ends 146 of the secondary resilient beams 144 are provided in mechanical and electrical engagement with inside surfaces 150 of the sidewalls 135. The free ends 146 are configured to move relative to the inside surfaces 150 as force is applied to the contact areas 142 of the contacts 130, as will be more fully described.

Figure 12:
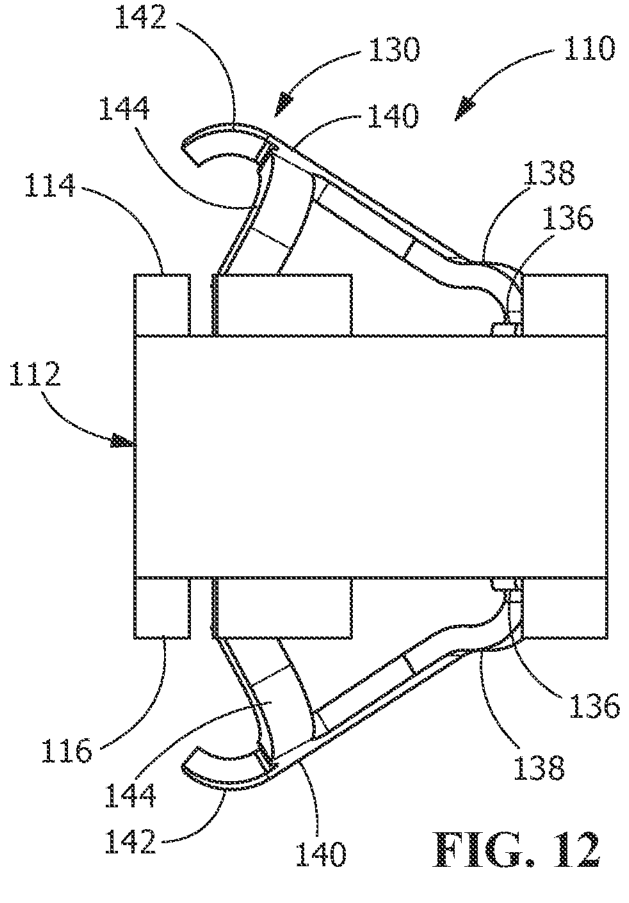
FIG. 12 is a side view of a representative open contact of the electrical connector of FIG. 9.

As shown in FIG. 12, with contacts 130 properly secured in the contact receiving openings 120, the contact portions 140 of respective primary resilient contact beams 134 extends or protrudes beyond the top surface 114 of the housing 112 so that conductive pads (not shown in the figures) of the integrated circuit 117 electrically and mechanically contacts the contact portions 140. Similarly, the contact portions 140 of other respective primary resilient contact beams 134 extends or protrudes beyond the bottom surface 116 of the housing 112 so that conductive pads (not shown in the figures) of the circuit board 119 electrically and mechanically contacts the contact portions 140.

As shown in FIG. 11, in operation, the electrical connector assembly 110 is moved into position relative the circuit board 119, such that respective bottom contact portions 140 of the contacts 130 are provided in line with the pads of the circuit board 119. The housing 112 of the connector assembly 110 is moved into engagement with the pads of the circuit board 119. As this occurs, force is applied to the bottom contact portions 140 which extend from the bottom surface 116 of the housing 112. This causes the bottom contact portions 140 to move in a direction toward the top surface 114 of the housing 112. As this occurs, the respective bottom primary resilient contact beams 134 are elastically deformed. In addition, as the bottom contact portions 140 are moved, the free ends 146 of the bottom secondary resilient beams 144 are frictionally slide across the inside surfaces 150 of the sidewalls 135. The elastic deformation of the bottom primary resilient contact beams 134 and the frictional engagement of the free ends 146 of the bottom secondary resilient beams 144 with the inside surfaces 150 of the sidewalls 135 as the free ends 146 are moved cause the bottom contact portions 140 to exert a normal force on the pads of the circuit board 119. This allows the bottom contact portions 140 to be retained in mechanical and electrical engagement with the contact pads of the circuit board 119. The movement of the bottom contact portions 140 is greater than approximately 0.8 mm, great than approximately 0.9 mm, greater than approximately 1.0 mm, less than approximately 1.5 mm. The normal force exerted by the bottom contact portions 140 is greater than approximately 15 grams, greater than approximately 20 grams, between approximately 15 grams and 30 grams, between approximately 20 grams and 25 grams. The connector assembly 110 is secured to the circuit board 119 using known methods.

An integrated circuit 117 is moved into position relative to the electrical connector assembly 110, such that respective top contact portions 140 of the contacts 130 are provided in line with the pads of the integrated circuit 117. The integrated circuit 117 is moved into engagement with housing 112 of the connector assembly 110. As this occurs, force is applied to the top contact portions 140 which extend from the top surface 114 of the housing 112. This causes the top contact portions 140 to move in a direction toward the bottom surface 116 of the housing 112. As this occurs, the respective top primary resilient contact beams 134 are elastically deformed. In addition, as the top contact portions 140 are moved, the free ends 146 of the top secondary resilient beams 144 are frictionally slide across the inside surfaces 150 of the sidewalls 135. The elastic deformation of the top primary resilient contact beams 134 and the frictional engagement of the free ends 146 of the top secondary resilient beams 144 with the inside surfaces 150 of the sidewalls 135 as the free ends 146 are moved cause the top contact portions 140 to exert a normal force on the pads of the integrated circuit 117. This allows the top contact portions 140 to be retained in mechanical and electrical engagement with the contact pads of the integrated circuit 117. The movement of the top contact portions 140 is greater than approximately 0.8 mm, great than approximately 0.9 mm, greater than approximately 1.0 mm, less than approximately 1.5 mm. The normal force exerted by the top contact portions 40 is greater than approximately 15 grams, greater than approximately 20 grams, between approximately 15 grams and 30 grams, between approximately 20 grams and 25 grams. The integrated circuit 117 is secured to the connector assembly 10 using known methods.

With the connector assembly 110 properly connected to the integrated circuit 117 and the circuit board 119, each contact 130 provides multiple electrical pathways for electrical signal transmissions. The first electrical pathways, as shown by arrow A in FIG. 13, are between the integrated circuit pads, the top contact areas 142 of the top contact portions 140, the top arcuate or curved portions 138, the top fixed end portions 136, the angled sections 133 of the base member 132, the bottom fixed end portions 136, the bottom arcuate or curved portions 138, the bottom contact areas 142 of the bottom contact portions 140 and the circuit board pad. The second electrical pathways, as shown by arrow B in FIG. 13, are between the integrated circuit pad, the top contact areas 142 of the top contact portions 140, the top secondary resilient beams 144, the sidewalls 135, the bottom secondary resilient beams 144, the bottom contact areas 142 of the bottom contact portions 140 and the circuit board pad. The allows the signal transmissions to transmitted at frequencies of approximately 224 Gbps or greater.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector comprising:

a housing having a first surface and a second surface, contact receiving openings extending from the first surface to the second surface;

contacts positioned in the contact receiving openings, the contacts having base members and primary resilient contact beams extending from opposed sides of the base members, sidewalls extending from opposed sides of the base members from which the primary resilient contact beams do not extend, the primary resilient contact beams having contact portions provided at free ends of the primary resilient contact beams, the contact portions having contact areas and secondary resilient beams;

the secondary resilient beams extending from either side of the primary resilient contact beams, the secondary resilient beams are bent such that free ends of the secondary resilient beams extend outside a plane of the contact areas.

2. The electrical connector as recited in claim 1, wherein each contact of the contacts has two primary resilient contact beams which are mirror images of each other.

3. The electrical connector as recited in claim 1, wherein the primary resilient contact beams are bent from the base members and extend obliquely therefrom, the primary resilient contact beams have fixed end portions, arcuate portions and contact portions, the fixed end portions extend from and are integrally attached to the base members, the arcuate portions extend from the fixed end portions to the contact portions.

4. The electrical connector as recited in claim 1, wherein the contact areas have a curved, convex shape and are provided in line with a longitudinal axes of the primary resilient contact beams.

5. The electrical connector as recited in claim 1, wherein the contact area and the secondary resilient beams of each contact form a U-shaped member.

6. The electrical connector as recited in claim 5 1, wherein the sidewalls are planar members connected to the base members by linking members which extend between the sidewalls and the base members.

7. The electrical connector as recited in claim 6, wherein the linking members are bent such that planes of the sidewalls extend in a direction which is perpendicular to planes of the base members.

8. The electrical connector as recited in claim 7, wherein the sidewalls have retention projections which extend from the sidewalls.

9. An electrical connector comprising:

a housing having a first surface and a second surface, contact receiving openings extending from the first surface to the second surface;

contacts positioned in the contact receiving openings, the contacts having base members and primary resilient contact beams extending from opposed sides of the base members, sidewalls extending from opposed sides of the base members from which the primary resilient contact beams do not extend, the primary resilient contact beams having contact portions provided at free ends of the primary resilient contact beams, the contact portions having contact areas and secondary resilient beams;

free ends of the secondary resilient beams provided in mechanical and electrical engagement with inside surfaces of the sidewalls, the free ends being configured to move relative to the inside surfaces as force is applied to the contact areas of the contacts.

10. The electrical connector as recited in claim 9, wherein first contact portions of the contact portions of first respective primary resilient contact beams extend beyond the first surface of the housing and second contact portions of the contact portions of second respective primary resilient contact beams extend beyond the second surface of the housing.

11. The electrical connector as recited in claim 9, wherein each contact provides multiple electrical pathways for electrical signal transmissions, the first electrical pathway is between first contact areas of the first contact portions, the first respective primary resilient contact beam, the base member, the second respective primary resilient contact beam, and second contact areas of the second contact portion, the second electrical pathway, is between the first contact areas of the first contact portion, first secondary beams of the secondary resilient beams, the sidewalls, second secondary beams of the secondary resilient beams, and the second contact areas of the second contact portion.

12. The electrical connector as recited in claim 9, wherein the base members have angled sections from which the resilient contact beams extend.

13. The electrical connector as recited in claim 12, wherein the sidewalls are planar members and are connected to the angled sections of the base members by linking members which extend between the sidewalls and the angled sections of the base members.

14. The electrical connector as recited in claim 13, wherein the linking members are bent such that the planes of the sidewalls extend in a direction which is less than perpendicular to planes of the base members, the sidewalls have inside surfaces, wherein prior to insertion into the contact receiving openings, the free ends of the secondary resilient beams are spaced from the inside surfaces of the sidewalls.

15. The electrical connector as recited in claim 14, wherein when the contacts are positioned in the contact receiving openings of the housing, the angled sections are positioned proximate to or in engagement with first sidewalls of the contact receiving openings and the sidewalls of the contacts are positioned proximate to or in engagement with second sidewalls of the contact receiving openings, the positioning of the sidewalls in engagement with the second sidewalls of the contact receiving openings causes the linking member 14-to be elastically deformed and the sidewalls of each contact to be moved toward each other.

16. The electrical connector as recited in claim 15, wherein when the contacts are positioned in the contact receiving openings the free ends of the secondary resilient beams are provided in mechanical and electrical engagement with the inside surfaces of the sidewalls, wherein the free ends are configured to move relative to the inside surfaces as force is applied to the contact areas of the contacts.

17. The electrical connector as recited in claim 16, wherein each contact provides multiple electrical pathways for electrical signal transmissions, the first electrical pathway is between first contact areas of the first contact portions, the first respective primary resilient contact beam, the angled sections of the base member, the second respective primary resilient contact beam, and second contact areas of the second contact portion, the second electrical pathway, is between the first contact areas of the first contact portion, first secondary beams of the secondary resilient beams, the sidewalls, second secondary beams of the secondary resilient beams, and the second contact areas of the second contact portion.

* * * * *